(12) United States Patent
Suokas

(10) Patent No.: US 11,034,481 B2
(45) Date of Patent: *Jun. 15, 2021

(54) PRODUCT PACKAGE AND A METHOD FOR PRODUCING THE PACKAGE

(71) Applicant: JOSPAK OY, Forssa (FI)

(72) Inventor: Jouni Suokas, Tammela (FI)

(73) Assignee: Jospak Oy, Forssa (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/085,120

(22) PCT Filed: Mar. 13, 2017

(86) PCT No.: PCT/FI2017/050160
§ 371 (c)(1),
(2) Date: Sep. 14, 2018

(87) PCT Pub. No.: WO2017/158233
PCT Pub. Date: Sep. 21, 2017

(65) Prior Publication Data
US 2019/0077573 A1    Mar. 14, 2019

(30) Foreign Application Priority Data

Mar. 15, 2016    (FI) ....................................... 20165216

(51) Int. Cl.
*B65D 5/24* (2006.01)
*B65D 5/60* (2006.01)
(Continued)

(52) U.S. Cl.
CPC ................ *B65D 5/243* (2013.01); *B32B 1/00* (2013.01); *B32B 1/02* (2013.01); *B32B 3/04* (2013.01);
(Continued)

(58) Field of Classification Search
CPC . B65D 5/243; B65D 1/34; B65D 5/20; B65D 5/28; B65D 5/56; B65D 5/563;
(Continued)

(56) References Cited

U.S. PATENT DOCUMENTS 3,085,479 A * 4/1963 Sigurd .................. B65D 5/241
493/133
3,316,102 A * 4/1967 Doll ..................... B65D 5/2033
229/116
(Continued)

FOREIGN PATENT DOCUMENTS

| EP | 2965997 A1 | 1/2016 |
|---|---|---|
| WO | 2009014483 A1 | 1/2009 |
| WO | 2009138786 A3 | 1/2010 |

*Primary Examiner* — Christopher R Demeree
(74) *Attorney, Agent, or Firm* — Luedeka Neely Group, P.C.

(57) ABSTRACT

The object of the invention is a product package and a method for producing the product package. The product package comprises a recess (1a) for the product to be packed, the recess being provided with a base and with walls in connection with the base, in which case the frame part (2) of the recess (1a) has been formed by means of folds from recyclable fiber material and the aforementioned recess (1a) is lined on the inside with a separate inner lining (3), which is removable from the aforementioned frame part. The top edges of the side walls and end walls of the frame part and also the top edges of the corner parts (10) form the top edge of the recess, which top edge is arranged to function as a fastening surface for the inner lining (3), which inner lining (3) is adapted to comprise an edge section (4) extending over the top edge (5a) of the recess (1a).

9 Claims, 4 Drawing Sheets

Figure 1:
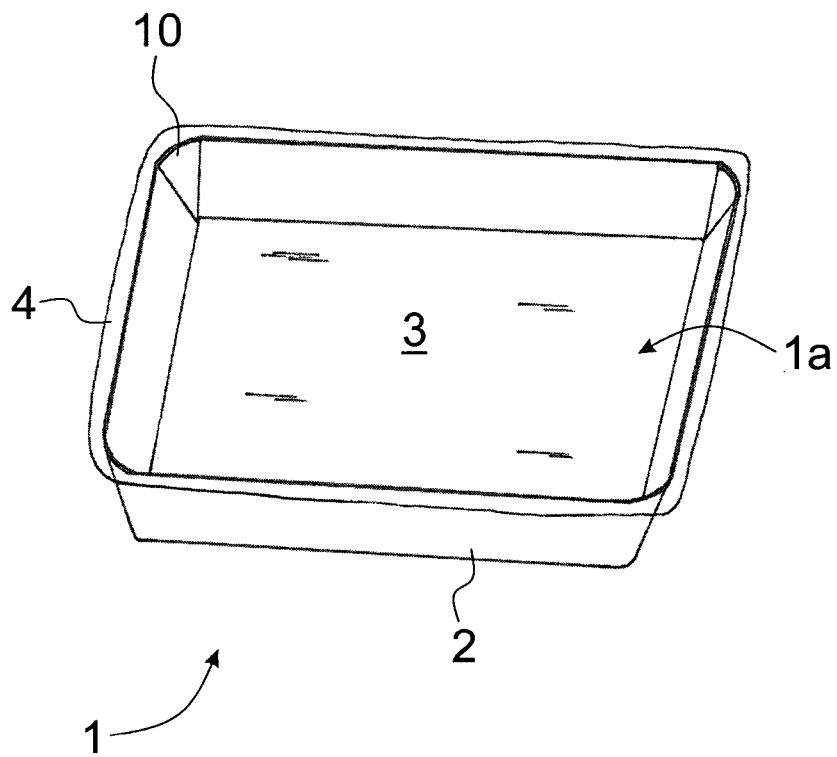

(51) Int. Cl.
    *B65D 5/56*     (2006.01)
    *B32B 1/00*     (2006.01)
    *B65D 5/20*     (2006.01)
    *B65D 25/16*     (2006.01)
    *B65D 77/20*     (2006.01)
    *B65D 5/28*     (2006.01)
    *B32B 29/08*     (2006.01)
    *B32B 3/28*     (2006.01)
    *B32B 29/00*     (2006.01)
    *B32B 3/04*     (2006.01)
    *B32B 1/02*     (2006.01)
    *B65D 1/34*     (2006.01)
    *B65D 81/34*     (2006.01)
    *B65B 7/28*     (2006.01)
    *B65D 77/06*     (2006.01)

(52) U.S. Cl.
    CPC .............. *B32B 3/28* (2013.01); *B32B 29/002* (2013.01); *B32B 29/08* (2013.01); *B65B 7/2878* (2013.01); *B65D 1/34* (2013.01); *B65D 5/20* (2013.01); *B65D 5/28* (2013.01); *B65D 5/56* (2013.01); *B65D 5/563* (2013.01); *B65D 5/60* (2013.01); *B65D 25/16* (2013.01); *B65D 77/2024* (2013.01); *B65D 81/3453* (2013.01); *B32B 2307/748* (2013.01); *B32B 2439/70* (2013.01); *B65D 5/2076* (2013.01); *B65D 5/246* (2013.01); *B65D 5/603* (2013.01); *B65D 77/06* (2013.01); *B65D 77/20* (2013.01); *B65D 2565/385* (2013.01)

(58) Field of Classification Search
    CPC ...... B65D 5/60; B65D 25/16; B65D 77/2024; B65D 81/3453; B65D 5/24; B65D 5/248; B65D 2577/2025; B65D 2581/3498; B65D 5/241; B65D 5/3657; B65D 77/046; B32B 1/00; B32B 2317/12; B32B 27/10; B65B 7/2878; B31B 2110/35; B31B 2120/70
    USPC ........... 229/407, 186, 114, 903, 122.34, 187, 229/406, 902; 426/129, 124; 428/43; 53/175; 493/100, 95; D7/602; 206/484, 206/518, 557

See application file for complete search history.

(56) References Cited

U.S. PATENT DOCUMENTS

| | | | | |
|---|---|---|---|---|
| 3,785,544 A | * | 1/1974 | Smith | B65D 25/34 206/446 |
| 3,863,832 A | * | 2/1975 | Gordon | B65D 5/2047 229/125.35 |
| 4,257,530 A | | 3/1981 | Faller | |
| 4,343,428 A | * | 8/1982 | Persson | B65D 5/2038 229/110 |
| 4,351,473 A | * | 9/1982 | Manizza | B65D 5/2047 229/123.2 |
| 4,586,648 A | * | 5/1986 | Josefsson | B65D 5/6626 229/114 |
| 4,713,510 A | * | 12/1987 | Quick | B32B 27/10 219/730 |
| 4,901,911 A | * | 2/1990 | Drexhage | B65D 5/2047 229/114 |
| D311,336 S | * | 10/1990 | Haraldsson | D9/433 |
| D311,337 S | * | 10/1990 | Rigby | D9/433 |
| 4,982,872 A | | 1/1991 | Avery | |
| 5,356,070 A | | 10/1994 | Rigby | |
| 5,679,109 A | * | 10/1997 | Gics | B31B 50/00 156/556 |
| 5,709,167 A | * | 1/1998 | Kelley | A01K 39/014 119/168 |
| 5,782,374 A | | 7/1998 | Walker | |
| 6,079,555 A | * | 6/2000 | Posson | B65D 81/26 206/204 |
| 6,248,380 B1 | | 6/2001 | Kocher et al. | |
| D582,728 S | * | 12/2008 | Fite, IV | D7/587 |
| D600,550 S | * | 9/2009 | King | D9/433 |
| 8,011,568 B2 | | 9/2011 | Maeaettae et al. | |
| 9,144,939 B2 | | 9/2015 | Balke | |
| 9,457,929 B2 | * | 10/2016 | Jenkins | B65D 5/242 |
| 2012/0228306 A1 | | 9/2012 | Wallace | |
| 2016/0001917 A1 | * | 1/2016 | Gould | B65D 77/003 229/171 |

* cited by examiner

PRODUCT PACKAGE AND A METHOD FOR PRODUCING THE PACKAGE

This application is a Section 371 national phase entry of PCT application PCT/FI2017/050160, filed Mar. 13, 2017. This application also claims the benefit of the earlier filing date of Finnish patent application 20165216, filed Mar. 15, 2016.

The object of the present invention is a product package, such as e.g. a foodstuff package, as presented in the preamble of claim 1, the package being manufactured mainly from recyclable fiber material, and a method for producing the aforementioned product package as presented in the preamble of claim 9. An advantageous alternative material can be corrugated board, board or some other suitable recyclable fiber material.

Known in the art are various foodstuff packages, in which are packed e.g. convenience foods, which can be heated in a microwave oven or corresponding. Most of these types of packages are nowadays fabricated wholly from plastic, which cannot be recycled. This produces a large environmental problem. The frame of a package is manufactured from some suitable plastic and it is lined inside with a separate foodstuff film. The package is shaped into a suitable shape in such a way that the desired amount of food can be packed into it. The shaping also comprises a horizontal edge flange circling the whole of the top edge of the package, which flange is intended as a fastening surface and a sealing base for the package lid, with which the package is closed in a leak-tight manner by heat sealing when the package has been filled and, if necessary, the food in it cooked. Often the food in a package must be cooked to completion before it can be sent onwards for sale as convenience food. A problem arises if the cooking takes place at a high temperature, which not all the plastics of package boxes endure, but instead special plastics that are expensive must be used in the boxes.

Also known in the art are foodstuff packages that are produced e.g. from board or corresponding and lined inside with a separate foodstuff film, as in conventional plastic packages. One such solution is disclosed in patent specification no. WO2009138786 (A2). On the top edge of the foodstuff package produced from board described in the specification in question is an essentially horizontal planar edge flange pointing sideways, for the fastening of the lid, as also in the plastic package described earlier. The package is additionally lined on the inside with a foodstuff film in such a way that the film also comes onto the top of the edge flange. A problem in this solution is inter alia that making the edge flange complicates the manufacturing of a board package.

In both the aforementioned solutions, i.e. in both plastic packages and board packages, another problem is that the edge flange intended for fastening the lid increases the outer dimensions of the package, as a consequence of which the package takes up to 20 percent more space in the horizontal direction compared to if there were no edge flange. When a number of packages are stored side-by-side, a smaller space requirement would be a great advantage. Moreover, a package with edge flanging needs more material than is needed for a package without an edge flange, which increases costs.

The edge flange can also cause problems for fastening the lid with heat sealing, because fastening the lid in such a way that the package becomes leak-tight enough is challenging. When the heat sealing is performed, the edges of the lid are pressed against the edge flange. It is a problem, however, that not all the pressing is exerted on the sealing point, but instead some of the pressing is distributed over a wider area on an edge flange thicker than the plastic lid. Consequently, proper sealing is not necessarily the result. The thickness of the edge flange can also vary, which can affect the success of the sealing. Dirt or food splashed there during heating can, in some circumstances, also be on the edge flange. In these types of cases the sealing is not necessarily good enough. If the sealing does not reliably succeed and the package is not sufficiently leak-tight, the package has to be wrapped inside separate plastic, which in turn increases the material costs and space requirement, and the package is not as neat in its outward appearance as without this additional wrapping.

The purpose of the present invention is to eliminate the aforementioned drawbacks and to provide an inexpensive and flexible product package that is space-efficient and cost-effective. The purpose is also to provide a product package, the fastening of the lid of which is reliable and the product package is therefore leak-tight when it is closed with the lid. The product package according to the invention is characterized by what is disclosed in the characterization part of claim 1. Correspondingly, the method according to the invention for producing the aforementioned product package is characterized by what is disclosed in the characterization part of claim 9. Other embodiments of the invention are characterized by what is disclosed in the other claims.

Preferably the product package according to the invention comprises at least a recess for the product to be packed, the recess being provided with a base and with walls in connection with the base, in which case the frame part of the recess is formed by means of folds from recyclable fiber material and the aforementioned recess is lined on the inside with a separate inner lining, which is removable from the aforementioned frame part. It is characteristic of the invention that the top edges of the side walls and end walls of the frame part and also the top edges of the corner parts form the top edge of the recess, which top edge is arranged to function as a fastening surface for the aforementioned inner lining, which inner lining is adapted to comprise an edge section (4) extending over the top edge of the recess.

The method according to the invention is characterized in that, in connection with fastening the inner lining, the section of the inner lining extending over the top edge of the recess is used for tensioning the inner lining against the top edge of the recess functioning as a fastening surface, and in that the lid of the product package is fastened to the section of the inner lining extending over the top edge of the recess.

One advantage, among others, of the solution according to the invention is that the product package is made mainly from recyclable material, which almost entirely eliminates the environmental problems associated with plastic packages. It is also an advantage that the closing of the product package with the lid can be done securely and reliably, whereby the package becomes leak-tight. From this follows the advantage that possible additional wrapping plastic is not needed. One advantage is also that on the top edge of the product package according to the invention there is no edge flange made from thick plastic, board or other material extending in the sideways direction, as a result of which the product package is smaller in its outer dimensions than product packages known in the art having a recess of the same size. From this follows the advantage that a product package also takes up less space than packages known in the art. Savings in space of up to 20 percent are possible. Omitting the edge flange also saves manufacturing material and makes manufacture of a product package easier. Another advantage also is that shaping of the product package is easy, as a result of which the corners of the package can e.g. be rounded, in which case a sharp corner will not e.g. break a plastic bag when the package is inside one.

Figure 2A:
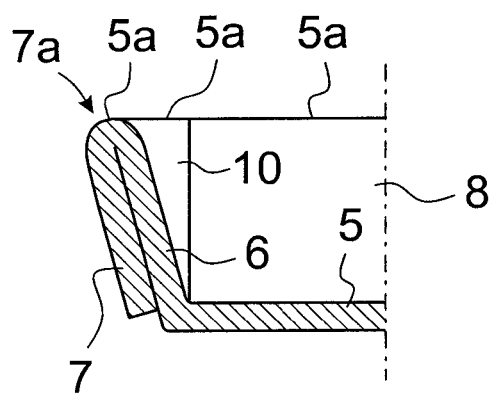
Figure 3A:
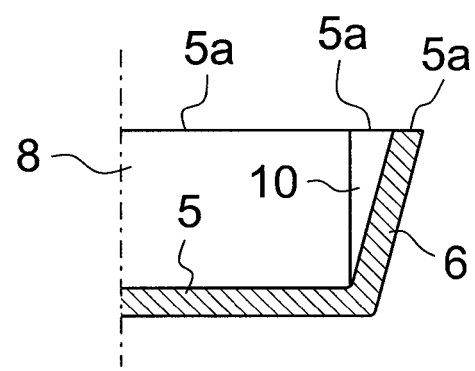
Figure 2:
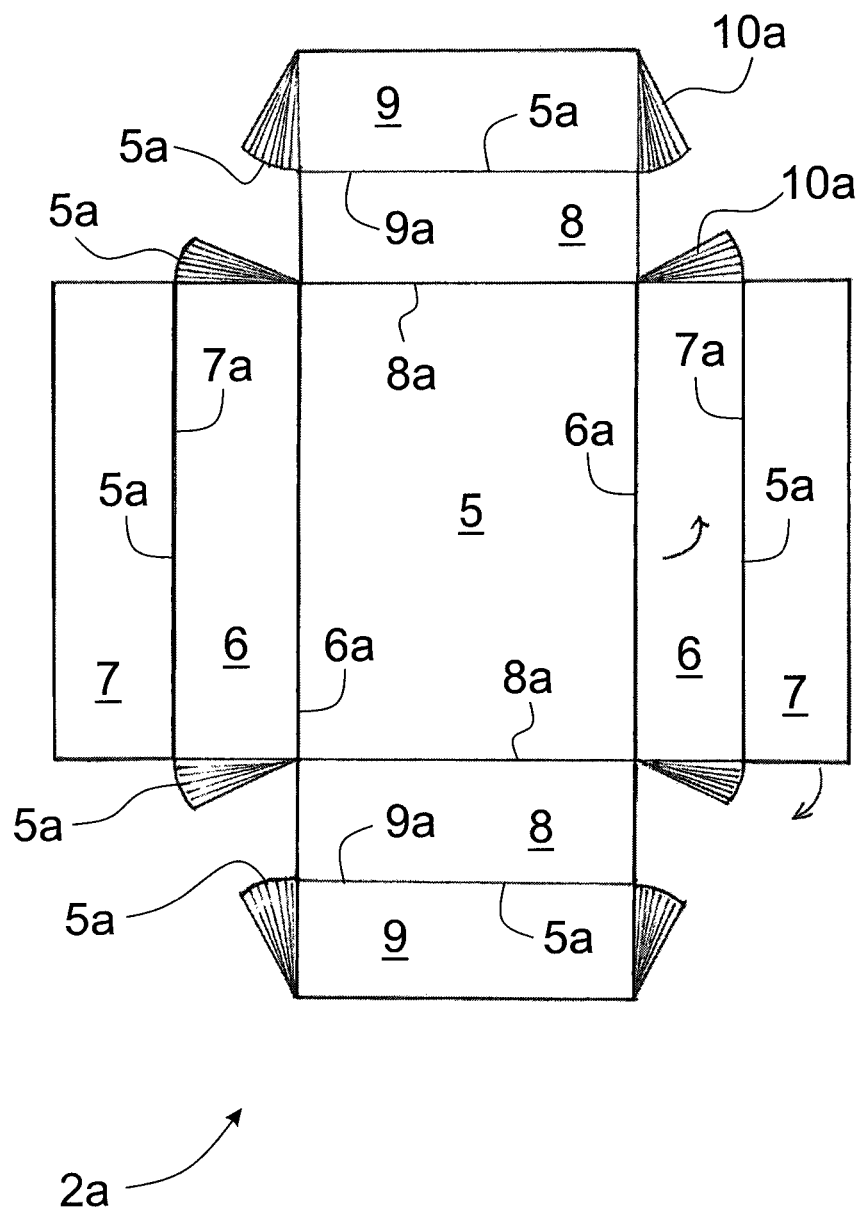
Figure 3:
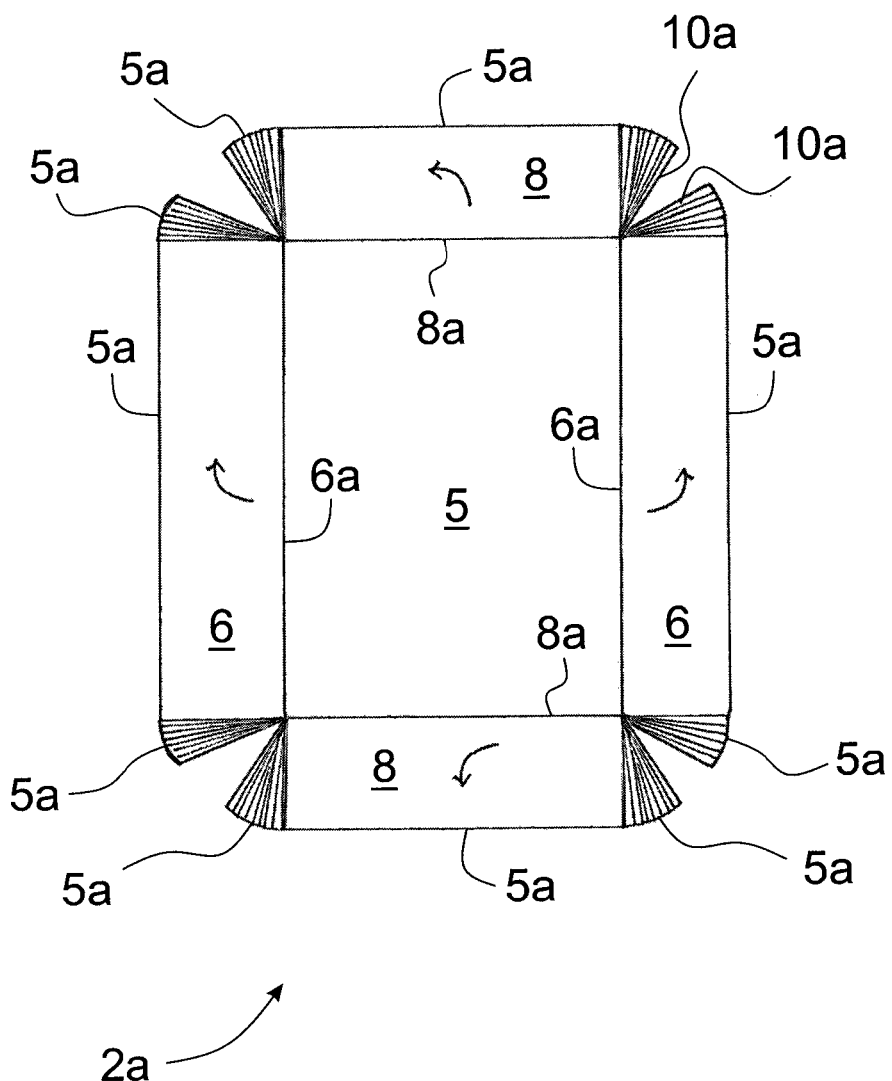
Figure 4:
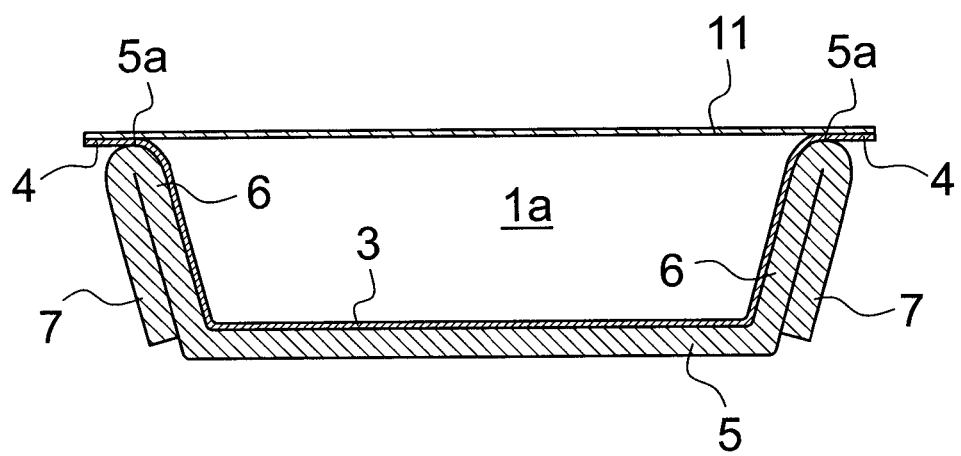
Figure 5:
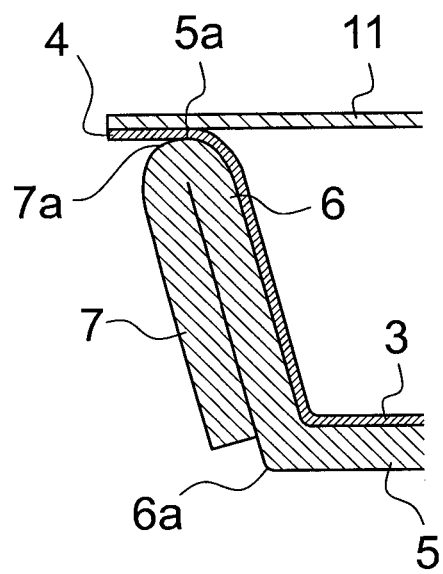
Figure 6:
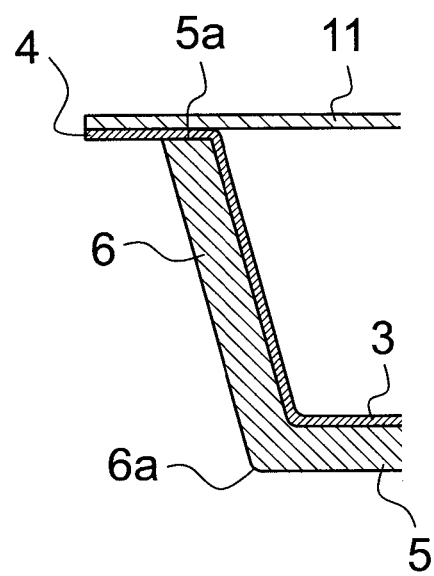

In the following the invention will be described in more detail by the aid of one example of its embodiment with reference to the attached simplified drawings, wherein FIG. 1 presents a product package according to the invention as viewed obliquely from the side and from above, FIG. 2 presents a top view of a product package according to the invention as an opened blank before it has been folded into a product package, FIG. 2a presents a simplified side view, not to scale, of one sectioned corner of the product package according to FIG. 2, FIG. 3 presents a top view of a second product package according to the invention as an opened blank before it has been folded into a product package, FIG. 3a presents a simplified side view, not to scale, of one sectioned corner of the product package according to FIG. 3, FIG. 4 presents a simplified side view, not to scale, of a sectioned product package according to the invention, with the lid fastened, FIG. 5 presents a simplified side view, not to scale, of one sectioned corner of the product package according to FIGS. 2 and 4, with the lid fastened, and FIG. 6 presents a simplified side view, not to scale, of one sectioned corner of the product package according to FIG. 3 with the lid fastened.

FIG. 1 presents a product package 1 according to the invention as viewed obliquely from the side and from above, while FIGS. 2 and 3 present the product package from above and with the folds opened. Preferably the product package 1 according to the invention is a foodstuff package, e.g. for a ready meal. The product package 1 comprises a frame part 2 and an inner lining 3, which comprises an edge, i.e. an edge section 4, extending over the top edges of the frame part 2. The frame part 2 comprises a base, two side walls, two end walls and the corner sections 10 between them. Some suitable recyclable fiber material is used as the manufacturing material of the frame part 2. Preferably the material is e.g. corrugated board, board or some other suitable recyclable fiber material. The inner lining 3 is foodstuff plastic and after use it can easily be detached from the frame part 2, in which case the frame part 2 can be delivered to recycling.

The frame part 2 is produced by folding it e.g. mechanically, from the blank 2a presented in FIG. 2 or 3 into its shape presented in FIG. 1. The blank 2a is precut to be such that a product package 1 of the desired shape and size is obtained from it by folding, which product package comprises a recess 1a provided with walls, the recess being for the food to be packed, such as for a foodstuff portion.

In the blank 2a of the frame part 2 presented in FIG. 2 is a base 5, side walls composed of the two parts 6 and 7, also end walls composed of the two parts 8 and 9, and additionally corner pieces 10a. The blank 2a is arranged to be folded into an assembled frame part 2 in such a way that the first parts, i.e. the inside parts 6 and 8, of the side walls and end walls are folded in a first direction, i.e. essentially upwards from the folding points 6a and 8a, and the second parts, i.e. the outside parts 7 and 9, of the side walls and end walls are folded into a second direction, i.e. essentially downwards, from the folding points 7a and 9a. The second parts 7 and 9 of the walls are folded into attachment with the first parts 6 and 8 and fastened to them e.g. by gluing. In this case the first parts 6 and the second parts 7 of the side walls together form the side walls of the frame part of the product package 1, the thickness of which side walls is essentially double the thickness of the blank material, and correspondingly the first parts 8 and the second parts 9 of the end walls together form the end walls of the frame part of the product package 1, the thickness of which end walls is essentially double the thickness of the blank material.

The folding of the frame part 2 is arranged to be carried out in such a way that the corner pieces 10a of the blank 2a overlap each other and they are fastened to each other by means of glue, in which case the corner pieces 10a form the corner parts 10 between the side walls and the end walls of the frame part 2. The corner parts 10 can be curved, as presented in the embodiment, in which case they form rounded corners. The corner parts 10 can just as well form beveled corners or also right-angled corners, as in rectangular boxes.

FIG. 2a presents a simplified side view of one sectioned corner of the product package 1 made from the blank 2a presented in FIG. 2. FIG. 2a is not presented to scale and the thickness of the blank material is exaggerated.

When the blank 2a has been folded to completion into a box-type frame part 2 comprising a recess 1a, the folding points 7a and 9a between the first and second parts 6 and 7 as well as 8 and 9 of the side walls and end walls and the top edges of the corner parts 10 form the essentially integral top edge 5a of the frame part 2 and simultaneously of the recess 1a. On the top edge 5a of the frame part 2 there are no edge flanges extending in the sideways direction, as there are in solutions known in the art, but instead only an essentially curved, possibly upwardly convex folding point 7a and 9a, which functions as a fastening surface for the inner lining 3.

In the blank 2a of the frame part 2 presented in FIG. 3 is a base 5, side walls composed of one part 6, and likewise end walls composed of one part 8, and additionally corner pieces 10a. The blank 2a is arranged to be folded into an assembled frame part 2 in such a way that the parts 6 and 8 forming the side walls and end walls are folded essentially upwards, from the folding points 6a and 8a, in which case a box-type frame part 2 comprising a recess 1a is formed, the thickness of the base 5 and side walls and end walls of which frame part being essentially the same as the thickness of the blank material.

FIG. 3a presents a simplified side view of one sectioned corner of the product package 1 made from the blank 2a presented in FIG. 3. FIG. 3a is not presented to scale and the thickness of the blank material is exaggerated.

When the blank 2a has been folded to completion into a box-type frame part 2 comprising a recess 1a, the free edges, i.e. the top edges, of the side walls and end walls 6 and 8 and the top edges of the corner parts 10 form the essentially integral top edge 5a of the frame part 2 and simultaneously of the recess 1a. On the top edge 5a of the frame part 2 there are no edge flanges extending in the sideways direction, as there are in solutions known in the art, but instead only a fastening surface essentially the thickness of the material of the blank for fastening the inner lining 3.

FIGS. 4-6 present a simplified side view of a sectioned product package 1 according to the invention, with the lid 11 fastened into position. The product package 1 is not presented to scale and for the sake of clarity the material thicknesses are presented as thicker than normal. In FIGS. 4-6 the parts of the inner lining 3 and of the lid 11 that extend to outside the top edges 5a of the product package 1 are, for the sake of clarity, presented as horizontal sections, but in reality they often bend downwards as much as the material of the lid 11 allows. When the material of the lid 11 is thin and soft, the aforementioned outer sections of the top edge 5a bend almost perpendicularly downwards when the product package 1 is in the normal position, e.g. on a table or other planar surface. The inner lining 3 and the lid 11 can be made to be such that they do not bend downwards by themselves, but instead they are deliberately folded downwards, they remain essentially horizontal, or they are folded upwards either obliquely or at a right angle.

The plastic inner lining 3 is fastened to the frame part 2 and it is arranged to make the package airtight together with the lid 11. The fastening of the inner lining 3 is performed e.g. in such a way that negative pressure is produced below the frame part 2 and positive pressure above it. By means of the negative pressure the inner lining 3, which has glue on its bottom surface, is arranged to be sucked into attachment with the inside surface of the frame part 2. This occurs by sucking the air out from between the frame part 2 and the inner lining 3 placed inside it through the frame part 2 by means of the negative pressure. The positive pressure above the package also gives further assistance to the fastening. With the method described above the inner lining 3 is attached in a leak-tight manner to the inside surface of the frame part 2.

As stated above, the frame part 2 has no edge flanges at all extending in the sideways direction. Instead, the inner lining 3 is dimensioned in such a way that it extends over the top edges 5a of the frame part 2 and forms an essentially narrow edge 4 resembling an edge flange. The lid 11 of the product package 1 is arranged to be fastened to this edge 4 e.g. with heat sealing or with some other suitable fastening method. Performing heat sealing directly onto the thin plastic of the inner lining 3 is considerably easier and more dependable compared to if there were a thicker edge flange under the plastic. This is because compressive force can be exerted directly onto the seam, in which case the compressive force being exerted onto the seam is certainly sufficient for achieving a reliable and leak-tight seam.

FIG. 6 presents a structure according to one preferred embodiment of the invention, which is also presented in FIGS. 3 and 3a. This structure differs from, among others, the structure according to FIGS. 4 and 5 in that only a single layer of material is in the side walls and end walls of the product package, i.e. only the wall parts 6 and 8 bent essentially upwards from the base 5, of which only one of the side wall parts 6 is presented in FIG. 6. The inner lining 3 is fastened to the inside surface and top edge 5a of the frame part 2 in essentially the same way as in the structure according to FIG. 5. Likewise, the lid 11 is fastened to the top surface of the inner lining 3 in essentially the same way as in the structure according to FIG. 5.

As stated previously, on the top edge 5a of the recess 1a there are no edge flanges extending in the sideways direction, but instead only a fastening surface essentially determined by the thickness of the material of the blank 2a for fastening the inner lining 3. In this case the material thickness of the essentially integral top edge 5a of the recess 1a is, depending on the structure of the wall of the product package 1, essentially between 1 . . . 2 times the material thickness of the package blank 2a.

It is obvious to the person skilled in the art that the invention is not limited solely to the examples described above, but that it may be varied within the scope of the claims presented below. Thus, for example, some structural solutions can also be different to what is presented above. In this case the outer layer of the side walls and end walls of the frame part presented e.g. in FIGS. 2, 2a, 4 and 5 can be essentially narrower than the inner layer, in which case the outer layer extends from the top edge of the wall downwards for only a short distance, but however extends downwards far enough for it to strengthen the top edges of the walls and make possible a fastening surface, wider than one wall layer, for the inner lining.

It is also obvious to the person skilled in the art that the product packages can also be different in shape to what is presented above. The simplest and most common frame part of a product package is of a rectangular shape, which is presented as an embodiment in all the figures. However, the shape of a package can be other than the rectangular-type shape of a box. Thus the shape can be e.g. polygonal or also round or oval, depending on e.g. the fold lines prefabricated in the blank.

It is further obvious to the person skilled in the art that the product packages can be of some other material than recyclable fiber material. Thus, the frame part of a product package can be produced from some other foldable material than corrugated board. The frame part of a product package can be produced e.g. from different boards, cardboards or papers or also from woven material, or from combinations of different materials.

The invention claimed is:

1. Product package, which comprises a recess for the product to be packed, the recess being provided with a base and with walls in connection with the base, in which case a frame part of the recess has been formed by means of folds from recycleable fiber material and the aforementioned recess is lined on the inside with a separate inner lining, which is removable from the aforementioned frame part, characterized in that top edges of side walls and end walls of the frame part and also top edges of corner parts form the top edge of the recess, which top edge is arranged to function as a fastening surface for the aforementioned inner lining, which inner lining is adapted to comprise an edge section extending over the top edges of the recess,
wherein the frame part has no edge flanges extending in a sideways direction, and
wherein the fastening surface of the top edge of the recess for the inner lining is a folding point, where an upward pointing wall part is folded into a downward pointing wall part, and also the fastening surface on the corner parts of the recess is the top edges of two corner pieces fastened to overlap each other.

2. Product package according to claim 1, characterized in that the top surfaces of the folding points of the side walls and end walls and the top edges of the corner parts form the essentially integral top edge of the frame part and simultaneously of the recess.

3. Product package according to claim 1, characterized in that the top edges of the side walls and end walls and the top edges of the corner parts form the essentially integral top edge of the frame part and simultaneously of the recess.

4. Product package according to claim 1, characterized in that the material thickness of the essentially integral top edge of the recess is essentially between 1 . . . 2 times the material thickness of the package blank.

5. Product package according to claim 1, characterized in that the material of the frame part is recycleable board.

6. Product package according to claim 1, characterized in that the product package is a foodstuff package and the inner lining is foodstuff plastic.

7. Method for producing a product package, which product package comprises a recess for the product to be packed, the recess being provided with walls, in which case the frame part of the recess has been formed by means of folds from recycleable fiber material and the aforementioned recess is lined on the inside with a separate inner lining, which is removable from the aforementioned frame part, characterized in that a lid of the product package is fastened to an edge section of the inner lining extending over top edges of the recess, wherein the inner lining is fastened to a top edge of the recess along a folding point in the walls of frame part formed where an upward pointing wall part is folded into a downward point wall part, and wherein the frame part has no edge flanges extending in a sideways direction.

8. Method according to claim 7, characterized in that the lid of the product package is fastened with heat sealing or with some other suitable fastening method to the section of the inner lining extending over the top edge of the recess by performing the heat sealing or other fastening directly onto the section of the inner lining.

9. Method according to claim 7, characterized in that, in connection with the fastening of the inner lining, the section of the inner lining extending over the top edge of the recess is used for tensioning the inner lining against the top edge of the recess functioning as a fastening surface.

\* \* \* \* \*